United States Patent [19]
Petrovich et al.

[11] Patent Number: 5,644,952
[45] Date of Patent: Jul. 8, 1997

[54] MODIFIED VEHICLE BRAKE ACTUATOR

[75] Inventors: Paul A. Petrovich, Fowlerville; Jack G. Rodgers, Roseville; John J. Schmitz, St. Clair Shores, all of Mich.

[73] Assignee: The United States of America as represented by the Secretary of the Army, Washington, D.C.

[21] Appl. No.: 605,304

[22] Filed: Jan. 29, 1996

[51] Int. Cl.⁶ .................................................. G05G 11/00
[52] U.S. Cl. ........................... 74/480 R; 74/489; 74/625; 180/335
[58] Field of Search .................. 74/480 R, 489, 74/625, 551.8, 479.01, 484 R; 188/24.22, 105; 180/332, 335; 192/99 R, 99 S

[56] References Cited

U.S. PATENT DOCUMENTS

| | | | |
|---|---|---|---|
| 4,574,654 | 3/1986 | Griffiths | 74/625 |
| 4,630,703 | 12/1986 | Fletcher | 74/551.8 X |
| 4,637,503 | 1/1987 | Vohl | 192/99 S X |
| 4,854,188 | 8/1989 | Griffiths | 74/625 |

*Primary Examiner*—Charles A. Marmor
*Assistant Examiner*—Troy Grabow
*Attorney, Agent, or Firm*—Peter A. Taucher; David L. Kuhn

[57] ABSTRACT

A manual braking mechanism is adapted for manually overridable remote control. The mechanism is disposed in a generally planar region forward of a vehicle's handle bar that does not interfere with the vehicle body or a human vehicle driver. The mechanism includes a base plate releasably clamped to the vehicle's handle bar and a housing fixed on the base plate. A brake cylinder in the housing connects to a control lever swingable on the base plate about a lever axis, and the cylinder's reaction force biases the lever toward a brake releasing position. A link pivots on the plate at the lever axis, has a hinge connection remote from the lever axis and has a carrier closer to the lever axis to the hinge connection. The carrier cammingly rotates the lever as the link swings on the lever axis. The mechanism has a frame whose first leg connects to the base plate at the lever axis and the frame's second leg is releasably clamped to the handle bar. The clamps for the base plate and second leg can be loosened to turn the modified braking mechanism on the handle bar. A third leg of the frame pivotally supports one end of a motor unit while the motor unit's opposite end engages the link's hinge connection. An extensor translates into and from the motor unit to swing the link so that the lever may release or apply the vehicle brake. The hinged connection utilizes a manually removable quick release pin that allows rapid decoupling of the motor unit from the link, after which the motor unit can be swung free of the link.

12 Claims, 1 Drawing Sheet

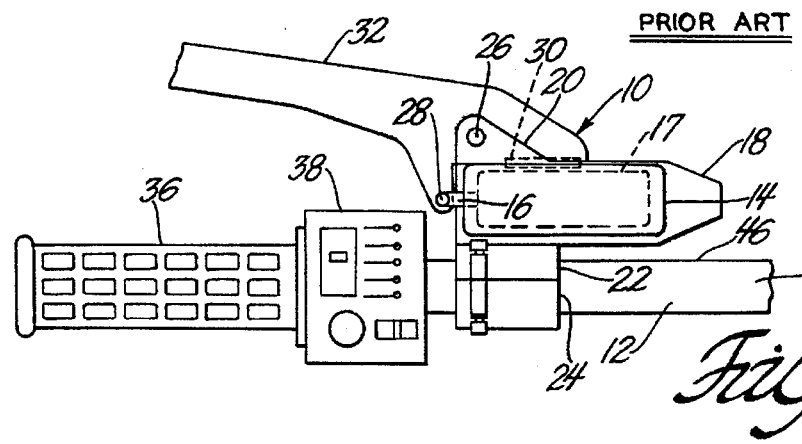
Fig. 1 PRIOR ART
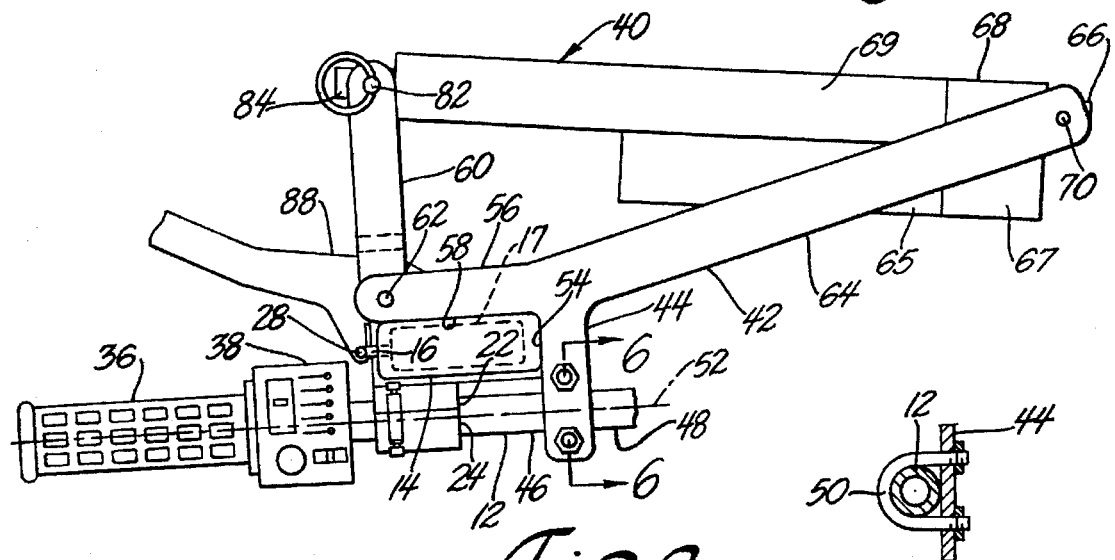
Fig. 2
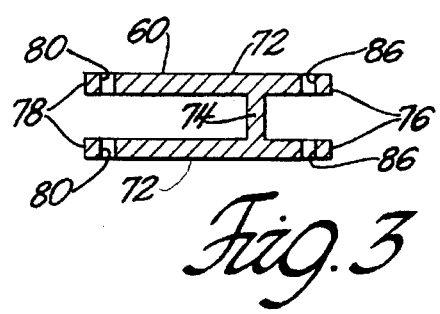
Fig. 3
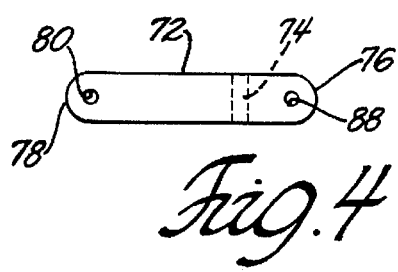
Fig. 4
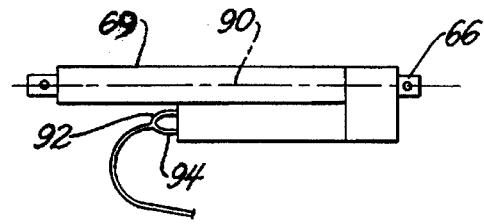
Fig. 5
Fig. 6

MODIFIED VEHICLE BRAKE ACTUATOR

GOVERNMENT USE

The invention described here may be made, used and licensed by or for the U.S. Government for governmental purposes without paying us royalty.

BACKGROUND AND SUMMARY

Currently the US Army is investigating methods to remove unexploded shells from artillery ranges and secured battle zones. One promising method is the use of remotely controlled vehicles having robotic accessories for shell removal. Since the vehicles will perform highly risky operations, it is likely that they will be damaged or destroyed with some regularity. It is therefore preferred that such vehicles be as cheap and expendable as possible. One practical and relatively inexpensive way to obtain such vehicles is to modify small commercially available off-road vehicles. It is preferred that these modified vehicles be capable of both manual and robotic operation.

To meet part of the above requirements, we have uniquely converted an existing manual brake actuator into a manually overridable, remotely controllable device. The converted actuator has a base and a clamp releasably fixing the base to the handle bar of a vehicle. A brake cylinder biases a lever swingable on the base toward a brake releasing position. A link having a common swing axis with lever has a hinge connection remote from this common axis, and the link includes a carrier closer to the common axis than to the hinge connection. The carrier cams upon the lever as the link swings the lever in a brake applying direction.

The converted actuator has a one-piece frame easily made from flat metal stock, and a first leg of the frame connects to the base at the common axis. A second frame leg is releasably clamped to the handle bar, whereby clamps for the base plate and second leg can be loosened to turn the actuator to a new angular position on the handle bar. A third frame leg swingably mounts one end of a motor unit which drives the link. The opposing end of the motor unit is releasably pivoted to the link by a quick release pin at the link's hinge connection. The motor's back drive force is greater than the biassing force of the cylinder, so that if the motor unit loses power during remote brake actuation, the motor unit will keep the actuator in a brake applying mode. Removal of the release pin decouples the motor unit so that the motor unit can not pivot the link or maintain brake actuation.

BRIEF DESCRIPTION OF THE DRAWINGS

FIG. 1 is a plan elevational view of a conventional brake control assembly for a commercially available utility vehicle.

FIG. 2 is a plan view of our brake actuator subassembly as installed on the conventional brake control assembly.

FIG. 3 is a sectional view of an H-shaped link forming part of the brake actuator subassembly.

FIG. 4 is a top elevational view of the H-shaped link.

FIG. 5 is a top elevational view of the motor unit for the brake actuator subassembly.

FIG. 6 is a sectional view of a U-bolt and associated structure by which a mount frame of the brake control subassembly is clamped to a handle bar of the vehicle.

DETAILED DESCRIPTION

Shown in FIG. 1 is a conventional manually operated brake actuator 10 as positioned near the end of a vehicle handle bar 12. All the components of actuator 10 lie in a common general plane with handle bar 12. The actuator is forward of the handle bar so as not to interfere with the human operator or the vehicle body of the vehicle where the actuator is installed. Actuator 10 has a strong, rigid metal housing 14 shaped generally in the form of a rectangular box, and a hydraulic brake cylinder is schematically shown at 17 within the housing. A rod-like connector 16 extends out of housing 14 from cylinder 17. Housing 14 is affixed upon and is typically integral with a rigid planar metal base 18 having a generally triangular tab 20. Integral with base 18 is one semi-cylindrical portion 22 of a clamp whose other semi-cylindrical portion 24 bolts to portion 22 so as to rigidly fasten base 18 14 to handle bar 12. A conventional brake lever 32 pivotally attaches to tab 20 by pin 26 and pivotally attaches to connector 16 by pin 28. Lever 32 swings in the common general plane defined by the actuator and handle bar 12. A vertical flange 30 on lever 32 engages a complimentary vertical flange on base 18 to limit the swing of lever 32 away from hand grip 36 of handle bar 12. Unless lever 32 is manually forced toward grip 36 to apply the brakes, the reaction force of brake cylinder 17 within housing 14 will swing lever 32 away from grip 36, to the FIG. 1 position where flange 30 meets the complementary vertical flange. Disposed adjacent grip 36 is a control box semi-schematically shown at 38 affixed atop handle bar 12 above the common general plane.

Referring now to FIG. 2, our remotely controllable brake actuation subassembly 40 lies in the common general plane. The subassembly has a generally Y-shaped mount frame 42 that is preferably flat. Due to the frame's flatness, subassembly 40 more easily fits within the common general plane and frame 40 can be made from common metal plate stock. Frame 42 has a frame member in the form of leg 44 securely bolted onto a straight section 46 of handle bar 12 at a location between the clamp portions (22, 24) and zone 48 where handle bar 12 bends down toward the body (not shown) of the vehicle. Frame 42 is preferably secured to straight section 46 since frame 42 will otherwise be of more complex construction and will be more expensive to fabricate. Also, frame 42 would otherwise not lie in the same general plane as that defined by brake actuator 10, grip 36 and straight section 46. Typically, leg 44 is clamped to handle bar 12 by U-bolt 50 (FIG. 6), which fits closely with handle bar 12 or else interferes slightly therewith. U-bolt 50, or a like clamping mechanism, is preferred for attaching leg 44 to the handle bar as opposed to welding or a bolt through leg 44 and the handle bar. The preference exists since the U-bolt can be loosened, along with clamp portions 22 and 24, so that subassembly 40 and actuator 10 can be rotated as a unit about handle bar axis 52 until lever 32 is in the most comfortable position for a given person's hand.

It may be preferred that leg 44 abut housing 14 such that the edge of leg 44 facially contacts one end of housing 14 at interface 54. Frame 42 has another frame member, leg 56, which is normal to leg 44. Leg 56 can have one edge in facial contact with a longer side of housing 14 at interface 58. Because of interfaces 54 and 58, housing 14 acquires a second function: housing 14 acts as a brace to stabilize actuator frame 42 and subassembly 40 during the subassembly's operation.

The free end of leg 56 is connected to tab 20, lever 32 and an H-shaped link 60 by pin 62, which is simply a longer version of pin 26 in FIG. 1. Pin 62 normally fits closely but rotatably through complementary holes in tab 20, leg 56 and H-shaped link 60. Mount frame 42 has a third frame member in the form of an elongate attachment leg 64, which integrally forms a dog leg bend with both legs 46 and 56. Mount frame 42 pivotally connects to lug 66 of motor unit 68 by means of hinge pin 70. Motor unit 68 receives motive and control signals via lines 92 and 94 shown in FIG. 5.

As seen in FIGS. 3 and 4, H-shaped link 60 has two elongate link legs 72. The link's carrier or cross bar 74 is closer to first leg ends 76, which straddle lever 32, than to the other leg ends 78. Apertures 80 at leg ends 78 receive quick release pin 82, which also passes through motor unit extensor 84, so that motor unit 68 is pivotally attached to link 60. Apertures 86 at ends 76 accommodate pin 62 (FIG. 2) such that H-link 60 pivots on pin 62 and such that cross bar 74 slides cammingly on surface 88 of lever 32 as link 60 pivots.

Translation of extensor 84 out from motor unit 68 along axis 90 (FIG. 5) pivots link 60 about pin 62, and thereby swings lever 32 toward grip 36 to apply the vehicle brakes. Cross bar 74 is closer to pin 62 than to quick release pin 82 connecting extensor 84 to link 60, whereby a mechanical advantage exists reducing motor power needed to move lever 32. Reduction of needed motor power is an advantage in that a smaller motor unit can be used, the smaller motor unit fitting more easily in the aforementioned general plane. Retraction of extensor 84 into motor unit 68 allows lever 32 to swing away from grip 36 so as to release the brakes. The back drive force or internal friction of motor unit 68 is greater than the previously mentioned reaction force of brake cylinder 17 in housing 14. Thus, if motor unit 68 loses power during brake actuation, the brakes will remain actuated. The aforementioned mechanical advantage will help keep the brakes actuated.

Motor unit 68 has a motor housing 65 which encloses an electric motor. Housing 65 is disposed along and is integrally joined to an extensor housing 69 through which translates extensor 84. Motor housing 65 is adjacently beneath leg 64 of mount frame 42 and is located between extensor housing 69 and straight section 46 of handle bar 12. This location of motor housing 65 minimizes the spatial envelope occupied by motor unit 68 and subassembly 40. Motor unit 68 has a flat surface 67 that optionally is in sliding facial contact with the underside of leg 64, so that surface 67 stiffens leg 64. The stiffening of leg 64 allows the plate stock from which frame 42 is made to be of thinner, cheaper gauge and thus also reduces the spatial envelope occupied by subassembly 40.

As extensor 84 translates out of motor unit 68 to pivot link 60 in a first angular direction (counterclockwise in FIG. 2) about pin 62, a first reaction force exists which tends to pivot frame 42 in the opposite angular direction. The first reaction force is resisted by facial contact at interface 58 between the frame's leg 56 and housing 14. Similarly, as extensor 84 retracts into motor unit 68 to pivot link 60 in a second angular direction (clockwise in FIG. 2) about pin 62, a second reaction force exists which tends to pivot frame 42 oppositely, in the second angular direction. The second reaction force is resisted by the facial contact at interface 54 between the frame's leg 44 and housing 14. From the foregoing, it can be seen that facial contacts at 58 and 54 are a means to stabilize subassembly 40 during the subassembly's operation.

Subassembly 40 has features that facilitate manual override thereof. First, the camming engagement between cross bar 74 and lever 32 allows lever 32 to be manually swung toward grip 36 independently of subassembly 40, whereby manual brake actuation is independent of subassembly 40. Second, quick release pin 82 can be pulled from its connection with link 60 and extensor 84 to decouple motor unit 68 from link 60, so that motor unit 68 can be swung away from link 60 about pin 70. Thus pins 70 and 84 comprise means to achieve manual brake release should motor unit lock the brakes.

We wish it to be understood that we do not desire to be limited to the exact details of construction or method shown herein since obvious modifications will occur to those skilled in the relevant arts without departing from the spirit and scope of the following claims.

What is claimed is:

1. A vehicle braking mechanism adapted for both manual and remote control, comprising:

a base;

means for releasably fixing the base to the vehicle;

a brake cylinder;

a lever swingable on the base about a lever axis;

means to connect the lever to the cylinder, the cylinder biassing the lever away from a brake applying direction;

a link having a pivotal connection to the base and a hinge connection point remote from the pivotal connection;

a carrier of the link connected thereto, the carrier closer to the pivotal connection than to the hinge connection point, the carrier sliding on the lever as the link swings on the base;

a frame;

a first frame member of the frame connected to the base;

a second frame member of the frame fixed relative to the first frame member;

a motor unit;

hinged connections attaching the motor unit between the hinge connection point and the second frame member;

an extensor translatable relative to the motor unit, translation of the extensor swinging the link on the base.

2. The mechanism of claim 1 wherein one of the hinged connections is a means for quick manual decoupling of the motor unit such that the extensor is disabled from swinging the link and lever.

3. The mechanism of claim 2 wherein a backdrive force of the motor unit is greater than a biassing force of the cylinder on the lever.

4. The mechanism of claim 2 wherein the decoupling means is a quick release pin.

5. The mechanism of claim 1 wherein:

the mechanism is mounted by the fixing means to a straight portion of a handle bar of the vehicle;

the mechanism lies in a common general plane extending forward from the straight portion.

6. The mechanism of claim 5 further comprising:

a longitudinal axis of the straight portion;

third frame member of the frame;

means for releasably clamping the third frame member to the straight portion;

wherein loosening of the fixing means and the clamping means permits angular movement of the mechanism about the longitudinal axis.

7. The mechanism of claim 1 further comprising means for bracing the frame, the bracing means itself comprising:

a housing enclosing at least part of the brake cylinder, the housing fixed to the base, the housing having one side and another side;

a first edge of the frame member contacting the one side of the housing;

a second edge of the frame member contacting the other side of the housing.

8. The mechanism of claim 7 further comprising a third frame member of the frame, wherein:

the second edge of the frame is part of the third frame member;

the first edge of the frame member is part of the first frame member.

9. The mechanism of claim 8 wherein the edges of the frame facially contact the sides of the housing.

10. A braking mechanism mounted on a vehicle handle bar, the mechanism adapted for both manual and manually overridable remote control, the mechanism comprising:

a base;

means for releasably fixing the base to the handle bar;

a brake cylinder;

means for mounting the brake cylinder to the base;

a lever swingably mounted to the base and swingable about a lever axis;

means to connect the lever to the cylinder, the cylinder biassing the lever to swing oppositely from a brake applying direction of the lever;

a link having a pivotal connection to the base at the lever axis and a hinge connection point remote from the pivotal connection;

a carrier of the link fixed thereto, the carrier closer to the pivotal connection than to the hinge connection;

an engagement zone of the lever, the carrier cammingly sliding along the engagement zone as the link swings the lever in the brake applying direction;

a mounting frame;

a first leg of the frame connected to the base at the lever axis;

a second leg of the frame extending from the first frame member, the second leg releasably clamped to the handle bar;

a third leg of the frame fixed to the first leg and second leg;

a motor unit;

hinged connections pivotally connecting the motor between an end of said link remote from the lever axis and the third leg, a selected hinged connection being at the hinge connection point;

an extensor translatable relative to the motor unit, translation of the extensor swinging the link about the lever axis.

11. The mechanism of claim 10 wherein the mounting frame is a flat unit whose legs are integrally joined to one another.

12. The mechanism of claim 10 further comprising a flat surface on the motor unit, the flat surface facially sliding against the third leg, whereby the motor unit reinforces the third leg.

* * * * *